(12) United States Patent
Kabeya et al.

(10) Patent No.: US 8,943,655 B2
(45) Date of Patent: Feb. 3, 2015

(54) CLIP

(75) Inventors: Satoshi Kabeya, Aichi (JP); Makoto Kato, Aichi (JP); Hideyuki Kawaguchi, Aichi (JP); Atsutoshi Kaji, Aichi (JP)

(73) Assignee: Daiwa Kasei Industry Co., Ltd., Aichi (JP)

( * ) Notice: Subject to any disclaimer, the term of this patent is extended or adjusted under 35 U.S.C. 154(b) by 254 days.

(21) Appl. No.: 13/511,200

(22) PCT Filed: Sep. 28, 2010

(86) PCT No.: PCT/JP2010/066780
§ 371 (c)(1),
(2), (4) Date: May 22, 2012

(87) PCT Pub. No.: WO2011/065121
PCT Pub. Date: Jun. 3, 2011

(65) Prior Publication Data
US 2012/0227219 A1    Sep. 13, 2012

(30) Foreign Application Priority Data
Nov. 30, 2009  (JP) ................................ 2009-271455

(51) Int. Cl.
*A41F 1/00* (2006.01)
*F16B 21/12* (2006.01)
*B60R 11/02* (2006.01)
*F16B 5/06* (2006.01)

(52) U.S. Cl.
CPC ............ *F16B 21/125* (2013.01); *B60R 11/0217* (2013.01); *F16B 5/0657* (2013.01); *F16B 5/0642* (2013.01)
USPC ........................................................ 24/453

(58) Field of Classification Search
USPC .............. 24/458, 297, 581.11, 593.1, 593.11
See application file for complete search history.

(56) References Cited

U.S. PATENT DOCUMENTS

| 4,708,895 | A  | * | 11/1987 | Mizusawa ........................ 428/31 |
| 4,924,561 | A  | * | 5/1990  | Yoneyama ....................... 24/453 |
| 5,947,631 | A  | * | 9/1999  | Hironaka et al. ............. 403/397 |
| 7,337,505 | B1 | * | 3/2008  | Scroggie et al. ................ 24/297 |
| 2013/0199001 | A1 | * | 8/2013 | Jagoda ............................ 24/453 |

FOREIGN PATENT DOCUMENTS

| JP | A-S62-46736 | 2/1987 |
| JP | A-2002-31110 | 1/2002 |
| JP | A-2002-372011 | 12/2002 |

OTHER PUBLICATIONS

International Search Report and Written Opinion, mailed Oct. 26, 2010.

* cited by examiner

*Primary Examiner* — Victor Batson
*Assistant Examiner* — Matthew Sullivan
(74) *Attorney, Agent, or Firm* — Thomas | Horstemeyer, LLP

(57) ABSTRACT

A clip 200 includes a locking portion 6 and an operation portion 9. The locking portion 6 of the clip 200 is inserted into the clip insertion hole 7 exposed while the protrusion 1a of the panel 1 is fitted into a protrusion insertion hole 5a of a panel attaching portion 5. An upper surface 12b of a locking main body portion 12 of the clip 200 presses an inner surface of the clip insertion hole 7 to bend the protrusion 1a. A rear side inclined surface 19b of a hook portion 13 of the clip 200 presses a front side horizontal edge 21b on a ceiling surface of the clip insertion hole 7, and both connecting portions 14 of the clip 200 press vertical edges 22 of an inner wall surface of the clip insertion hole 7. The clip can easily and reliably fix a vibration generating member.

15 Claims, 18 Drawing Sheets

CLIP

CROSS-REFERENCE TO RELATED APPLICATION

This application is the 35 U.S.C. §371 national stage of PCT application entitled "CLIP", having serial number PCT/JP2010/066780, filed on Sep. 28, 2010. This application also claims priority to and benefit of Japanese Patent Application No. 2009-271455, filed on Nov. 30, 2009, which is incorporated by reference in its entirety.

TECHNICAL FIELD

The invention relates to a clip fixing a vibrating member such as a speaker (in-vehicle speaker) mounted on a vehicle, for example.

BACKGROUND ART

An in-vehicle speaker (hereinafter simply referred to as a "speaker") generates vibrations during use. The larger vibrations deteriorate sound quality and adversely affect peripheral members. If the speaker is rigidly fixed so as to suppress the vibrations, it takes time to assemble the speaker and if the assembly is simplified, it is difficult to prevent the generation of vibrations.

A conventional speaker is fixed by overlapping an attaching portion thereof with a bracket of a vehicle and fastening a bolt made of metal material with a grommet mounted on the attaching portion (see Patent Document 1). Therefore, two parts are required and an assembly operation is time-consuming.

In another disclosed technique, a flexible hook portion is disposed on an attaching portion of a speaker and inserted and locked into a hook-portion insertion hole of a bracket of a vehicle (see Patent Document 2). However, since the hook portion must be formed integrally with the attaching portion, the configuration of the attaching portion is problematically complicated.

PRIOR ART DOCUMENTS

Patent Documents

Patent Document 1: Japanese Laid-Open Utility Model Publication No. H7-25696
Patent Document 2: Japanese Laid-Open Utility Model Publication No. H7-4127

SUMMARY OF THE INVENTION

Problem to Be Solved by the Invention

The invention was conceived in view of the situations and a problem of the invention is to provide a clip capable of fixing a vibration generating member in a simple and reliable manner.

Means for Solving the Problem

The invention for solving the problem provides
a clip made of a resin material for fastening at least two members, comprising:
an operation portion operated by an operator for thrusting the clip into a clip insertion hole disposed in at least one of the two members; and a locking portion locking with the clip insertion hole while the clip is thrust into the clip insertion hole,
the clip disposed with a first pressing portion pressing the clip insertion hole from the inside at a connecting section between the operation portion and the locking portion,
the locking portion disposed with a second pressing portion separated from the locking portion except a base end to be elastically deformable about the base end, the second pressing portion having a section projected from the locking portion to press the clip insertion hole from the inside, wherein
when the locking portion is inserted into the clip insertion hole of the member, the first pressing portion is in close contact with a first opening edge of the clip insertion hole and the second pressing portion is in close contact with a second opening edge of the clip insertion hole while a bottom surface of the operation portion and a bottom surface of the locking portion abut on the member.

Effects of the Invention

The clip according to the invention is configured as described above and, when the locking portion is inserted into the clip insertion hole of the member, the first pressing portion is in close contact with the first opening edge of the clip insertion hole and the second pressing portion is in close contact with the second opening edge of the clip insertion hole while the bottom surface of the operation portion and the bottom surface of the locking portion abut on the member. Since the second pressing portion is in close contact with the second opening edge of the clip insertion hole, the clip is restrained in the longitudinal direction and the height direction. Since the first pressing portion is in close contact with the first opening edge of the clip insertion hole, the clip is restrained in the width direction. As a result, the two members are fixed. The clip of the invention needs only one member as compared to a conventional fastening means consisting of two members and is therefore inexpensive and reduced in weight. The operation of attaching the clip is a one-touch operation of thrusting the clip into the clip insertion hole and easily performed. Additionally, no tool is required. The clip can be removed by releasing the restraint between the first pressing portion and the first opening edge of the clip insertion hole.

Specifically, the second pressing portion has a triangular cross section and includes a first taper-shaped portion having a projecting length from the locking portion continuously increasing from a leading end of the locking portion toward the operation portion and a second taper-shaped portion connected via a top portion of the second pressing portion to the first taper-shaped portion and having a projecting length from the locking portion continuously decreasing toward the operation portion, and
when the first pressing portion comes into close contact with the first opening edge of the clip insertion hole, the second taper-shaped portion comes into close contact with the second opening edge of the clip insertion hole.
The operation portion has a rectangular plate shape,
the locking portion has a tongue shape extended from one surface of the operation portion in a thickness direction thereof, and when the bottom surface of the operation portion is located on a horizontal plane, the bottom surface of the locking portion is located lower than the bottom surface of the operation portion.

Therefore, the clip of the invention is inserted into the clip insertion hole in a tilted state as a whole. The clip is located in a compressed state with the bottom surface of the locking portion pressing the member. Due to this compression force, the two members are more rigidly attached to each other and a pressing force of the clip is more strengthened in the height direction. The clip is inserted into the clip insertion hole with the locking portion raised upward by the tilt. Therefore, the operation of inserting the clip is facilitated.

While the bottom surface of the operation portion and the bottom surface of the locking portion are located on the same horizontal surface, a section of the second pressing portion pressing an inner peripheral surface of the clip insertion hole in a height direction is obliquely located relative to the horizontal surface, and the obliquely located pressing portion presses the inner peripheral surface of the clip insertion hole in an oblique direction so that the member having the clip insertion hole is elastically deformed in an obliquely tilted manner.

Since the second pressing portion of the clip obliquely presses (elastically deforms) the inner surface of the clip insertion hole, an elastic restoring force from the member obliquely acts on the second pressing portion of the clip. This elastic restoring force increases a restraining force of the inserted clip and makes the clip hardly displaced.

The leading end of the locking portion desirably has a taper shape in a width direction and/or a height direction.

As a result, the operation of inserting the locking portion of the clip into the clip insertion hole is facilitated.

More specifically, one of the two members is a panel member disposed with a protrusion in a height direction; the protrusion is disposed with the clip insertion hole in a direction intersecting with the height direction;

the other of the two members is a panel member disposed with a protrusion insertion hole for inserting the protrusion of the panel member; and the protrusion of the one member has a lower end disposed with contact ribs pressing inner wall surfaces of the protrusion insertion hole from the inside when the protrusion is inserted into the protrusion insertion hole of the other panel member.

Since the panel member is disposed with the contact ribs, the two panel members are retained in a closely contact state. In particular, the panel member disposed with the clip insertion hole is restrained by the clip in the longitudinal direction, the width direction, and the vertical direction, and the panel member without the clip insertion hole is restrained by the contact ribs in the longitudinal direction and the width direction. Therefore, the members are retained unmovable. As a result, the two members are reliably fixed.

The contact ribs may be chamfered at leading ends.

As a result, the protrusion of the one panel member can smoothly be inserted into the protrusion insertion hole of the other panel member.

The second taper-shaped portion is disposed with a stepped portion in a step-like shape, and when the locking portion is inserted into the clip insertion hole of the member, the second opening edge may enter into and engage with the stepped portion.

As a result, the restraint of the clip inserted into the clip insertion hole is further reinforced in the longitudinal direction and the height direction.

The first pressing portion can be formed into a taper shape expanding in a width direction toward the operation portion in plan view of the clip and can be disposed with a thin-walled portion easily elastically deformed when the locking portion is inserted into the clip insertion hole of the member and comes into close contact with the first opening edge.

Since the clip of this aspect of the invention increases an amount of elastic deformation of the first pressing portion, a reaction force thereof is also increased and, therefore, the restraint of the clip is further reinforced in the width direction.

The inner peripheral surface of the clip insertion hole may be disposed with a protrusion pressing the locking portion of the clip inserted into the clip insertion hole of the member.

As in this aspect of the invention, the clip insertion hole may be processed instead of processing the clip.

A vibration generating member is attached to at least one of the members and the member can be an in-vehicle speaker.

MODES FOR CARRYING OUT THE INVENTION

Figure 1:
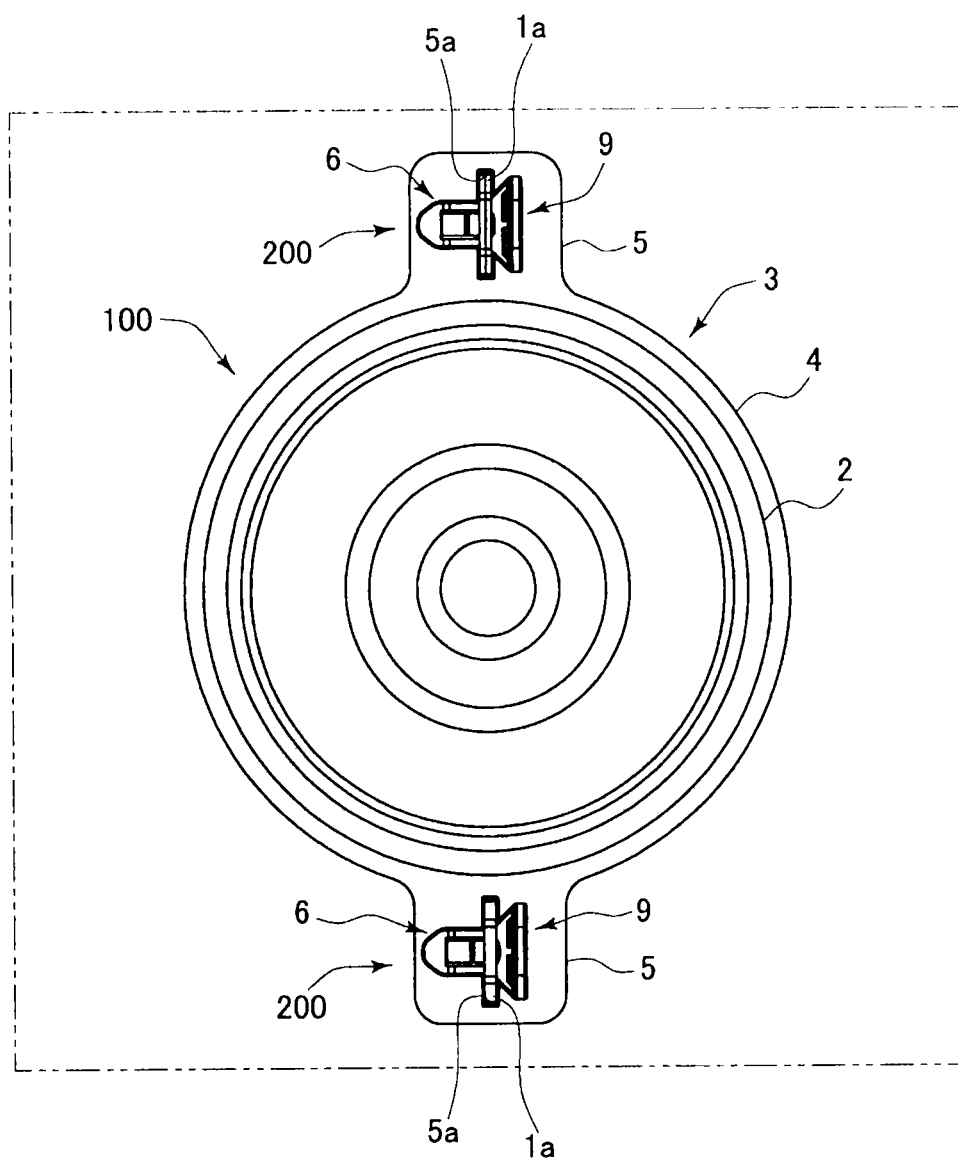
FIG. 1 is a plain view of a speaker 100 fixed by a clip 200 of an embodiment of the invention.
Figure 2:
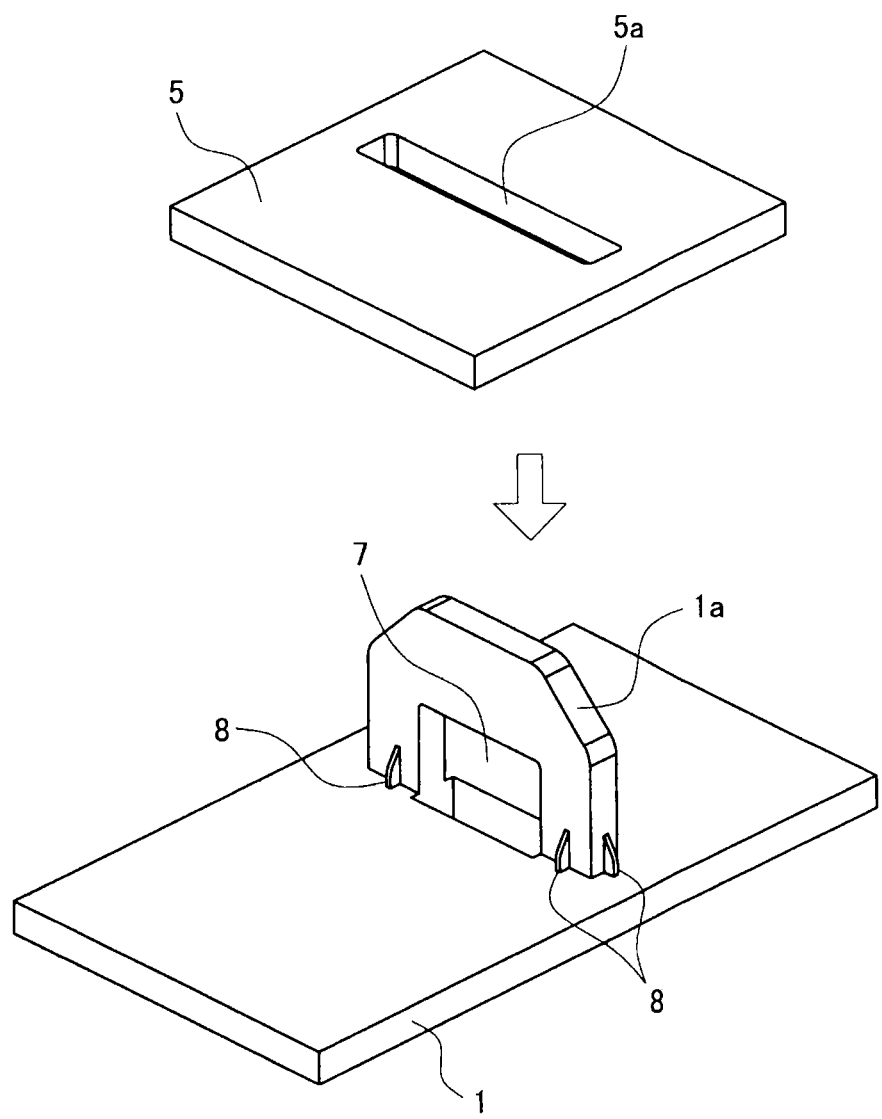
FIG. 2 is a perspective view of a panel 1 and a panel attaching portion 5 of a speaker bracket 3.
Figure 3:
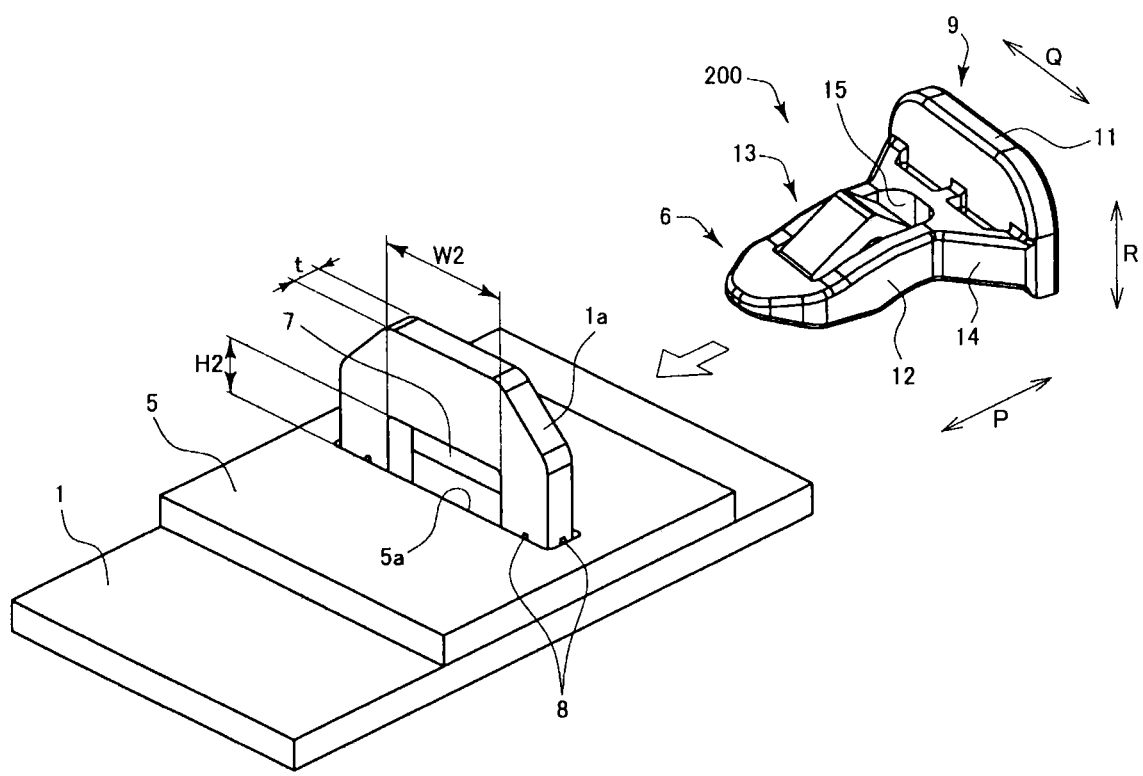
FIG. 3 is a perspective view of the clip 200.
Figure 4A:
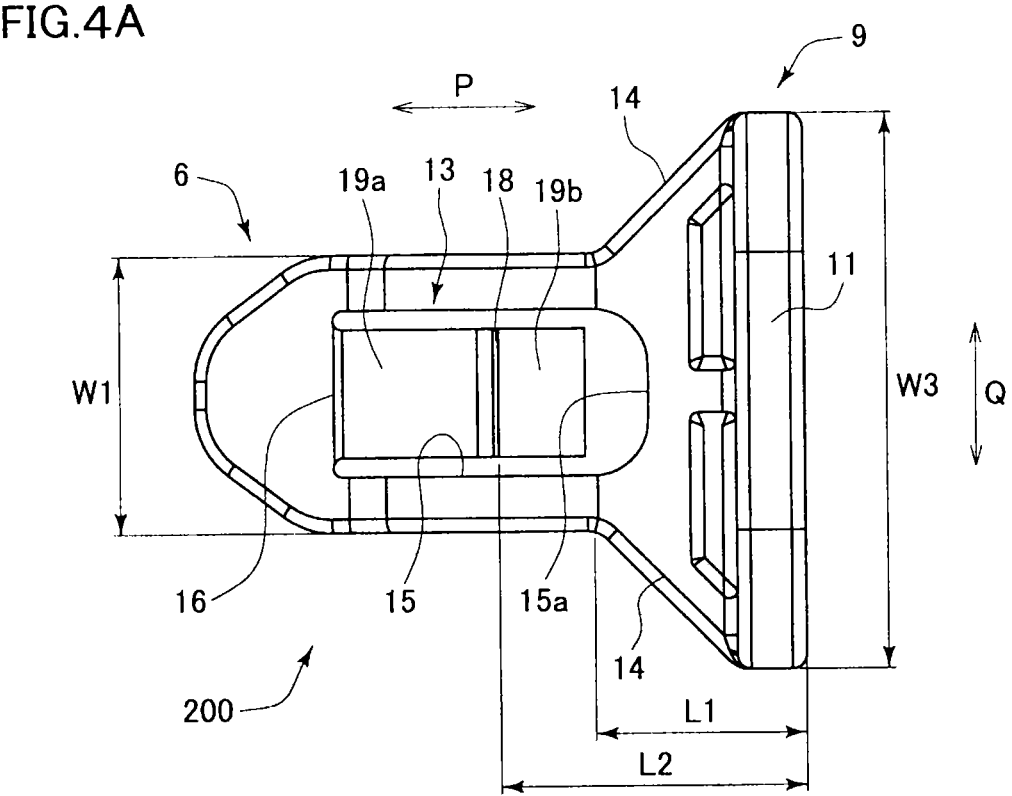
FIG. 4A is a plain view of the clip 200.
Figure 4B:
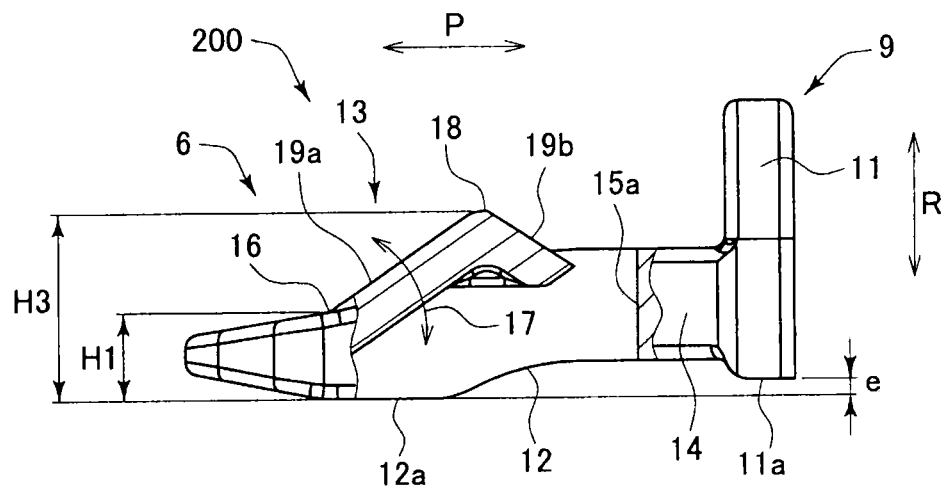
FIG. 4B is a front view of the same.

Embodiments of the invention will now be described in detail. FIG. 1 is a plain view of a speaker 100 fixed by a clip 200 of an embodiment of the invention; FIG. 2 is a perspective view of a panel 1 and a panel attaching portion 5 of a speaker bracket 3; FIG. 3 is a perspective view of the clip 200; FIG. 4A is a plain view of the clip 200; and FIG. 4B is a front view of the same.

First Embodiment

In this description, the clip 200 for fixing the in-vehicle speaker 100 to an instrument panel (hereinafter simple referred to as a "panel") of a vehicle will be described.

The speaker 100 will first be described. As depicted in FIG. 1, the speaker 100 is formed by fixing a speaker body 2 to a speaker bracket 3. The speaker bracket 3 is made of a thin metal plate and includes a circular speaker supporting portion 4 supporting the speaker body 2, and a pair of panel attaching portions 5 projected from the speaker supporting portion 4 in the radial direction of the speaker body 2. The panel 1 is provided with protrusions 1a located in sections corresponding to a pair of the panel attaching portions 5 in a section on which the speaker 100 is disposed. A pair of the panel attaching portions 5 is provided with protrusion insertion holes 5a for inserting the protrusions 1a of the panel 1. The speaker 100 is positioned and attached to a predetermined position of the panel 1 by fitting the protrusion insertion holes 5a of the speaker bracket 3 to the corresponding protrusions 1a of the panel 1.

As depicted in FIGS. 2 and 3, the protrusion 1a of the panel 1 has a trapezoidal shape in a front view and is provided with a rectangular clip insertion hole 7 facing an upper surface of the panel 1 for inserting a leading end (a locking portion 6) of the clip 200. Contact ribs 8 abutting on an inner wall surface of the protrusion insertion hole 5a are disposed at a junction between the protrusion 1a and the upper surface of the panel 1 (a lower end of the protrusion 1a) so as to prevent the protrusion 1a fitted into the protrusion insertion hole 5a from rattling in the protrusion insertion hole 5a (described later).

The clip 200 will then be described. As depicted in FIG. 3, the clip 200 of this embodiment is made of a resin material (e.g., polyacetal) and includes an operation portion 9 for operation by the operator and a locking portion 6 inserted and locked into the clip insertion hole 7 of the protrusion 1a of the panel 1 overlapped with the panel attaching portion 5. An operational wall 11 is disposed in a standing manner at a rear end of the clip 200 on which an operator places a finger when thrusting the clip 200 into the clip insertion hole 7. The operator pushes and operates the operation portion 9 of the clip 200 with a finger S (see FIG. 6). Therefore, a size (width) of the operational wall 11 is slightly larger than the fingertip S of an operator. In this description, a side of the clip 200 first inserted into the clip insertion hole 7 is defined as a "front side" and a direction of the insertion is described as a "longitudinal direction P". A direction orthogonal to the longitudinal direction P in the same plane is described as a "width direction Q", and a direction orthogonal to the longitudinal direction P and the width direction Q is described as a "height direction R".

As depicted in FIGS. 3 and 4, the locking portion 6 of the clip 200 is disposed to be connected to the operation portion 9 of the clip 200. The locking portion 6 includes a locking main body portion 12 extended from a section slightly above a bottom surface 11a of the operational wall 11 to the front side of the operational wall 11 in a direction intersecting with (in this embodiment, substantially orthogonal to) the operational wall 11, and a hook portion 13 disposed at substantially the center of the locking main body portion 12 in plan view. The locking main body portion 12 is extended obliquely downward as it goes forward and a bottom surface 12a is curved. In a front view of the clip 200 (see FIG. 4B), a front side surface of the operational wall 11 is substantially orthogonally connected to an upper surface 12b of the locking main body portion 12. When the clip 200 is located such that the upper surface 12b of the locking main body portion 12 becomes horizontal, the bottom surface 12a of the locking main body portion 12 is positioned lower by a distance e than the bottom surface 11a of the operational wall 11. The front end of the locking main body portion 12 has a taper shape in the width direction Q and the height direction R so as to facilitate the insertion into the clip insertion hole 7. A width W1 of the locking main body portion 12 is slightly narrower than an inner width W2 of the clip insertion hole 7 in the protrusion 1a of the panel 1, and a width W3 of the operational wall 11 is wider than the inner width W2 of the clip insertion hole 7 (W1<W2<W3). Therefore, a connecting portion 14 between the operational wall 11 and the locking main body portion 12 is inclined (in a taper shape) in plan view.

The hook portion 13 of the locking portion 6 is cut out by a cutout portion 15 having an approximate U-shape in plan view and is coupled to the locking main body portion 12 only by a base end 16 disposed on the front side. A free end (an end on the rear side) of the hook portion 13 has an approximately triangular cross section and a thickness of the base end 16 (an end on the front side) of the hook portion 13 (a thickness in the height direction R) is thinner than a thickness of the locking main body portion 12. Therefore, the hook portion 13 is elastically freely rotatable using the base end 16 as a fulcrum in a direction of an arrow 17.

While no force is applied to the hook portion 13, an apex section (a top portion 18) of the free end projects upward from the upper surface of the locking main body portion 12. A front section from the top portion 18 of the hook portion 13 is provided with a front side inclined surface 19a leading to the base end 16, and a rear section from the top portion 18 is provided with a rear side inclined surface 19b facing a rear end surface 15a of the cutout portion 15. A height H1 from the bottom surface 12a of the locking main body portion 12 to the base end 16 of the hook portion 13 is lower than an inside height H2 of the clip insertion hole 7 in the protrusion 1a of the panel 1 (an inside height while the panel 1 and the panel attaching portion 5 overlap with each other), and a height H3 to the top portion 18 of the hook portion 13 is slightly higher than the inside height H2 of the clip insertion hole 7 (H1<H2<H3).

A length L1 from a back surface of the operational wall 11 to the front end of the connecting portion 14 of the locking main body portion 12 is shorter than a distance L2 from the back surface to the top portion 18 of the hook portion 13 (L1<L2). Additionally, a distance from the connecting portion 14 of the locking main body portion 12 to the top portion 18 of the hook portion 13 (L2−L1) is shorter than a thickness t of the protrusion 1a (a length in the longitudinal direction P).

An operation of the clip 200 of this embodiment will be described in terms of the fixation of the speaker 100 to the panel 1. As depicted in FIGS. 1 and 2, the speaker bracket 3 with the speaker body 2 fixed to the speaker supporting portion 4 is located at a predetermined position of the panel 1 of a vehicle. In this state, the protrusions 1a disposed on the panel 1 are fitted into the protrusion insertion holes 5a disposed in a pair of the panel attaching portions 5 projected from the speaker bracket 3. As a result the speaker bracket 3 is positioned and attached to the predetermined position of the panel 1. As depicted in FIG. 3, the protrusion 1a of the panel 1 fitted into the protrusion insertion hole 5a in the panel attaching portion 5 of the speaker bracket 3 projects from the panel attaching portion 5 of the speaker bracket 3, exposing the clip insertion hole 7 disposed in the protrusion 1a. While the panel 1 is in close contact with the panel attaching portion 5 of the speaker bracket 3, the lower end surface of the clip insertion hole 7 is located lower than the upper surface of the panel attaching portion 5.

Figure 5A:
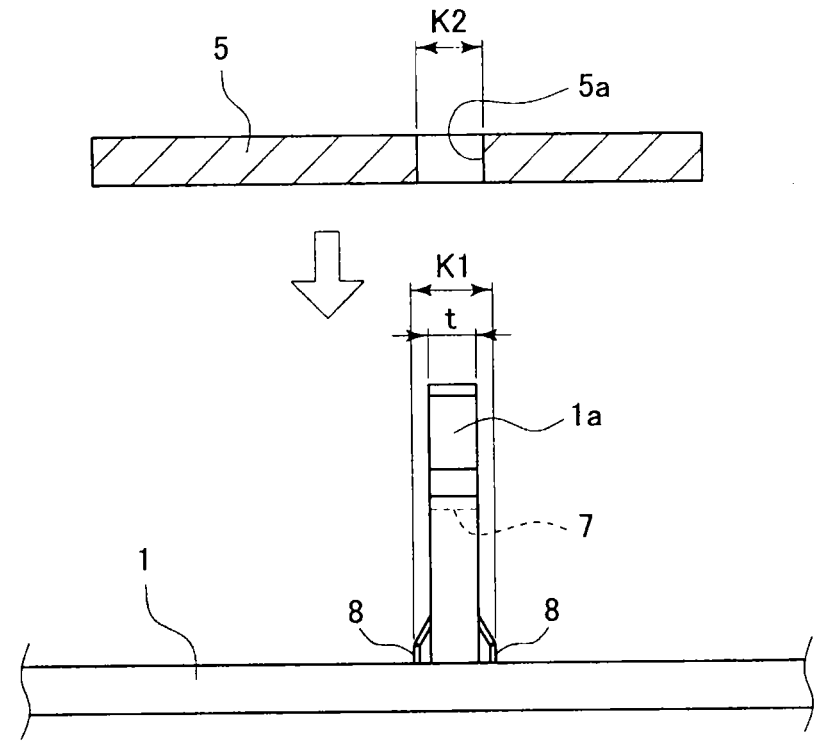
FIG. 5A is an operation explanatory diagram of a state of fitting a protrusion insertion hole 5a of the panel attaching portion 5 to a protrusion 1a of the panel 1.
Figure 5B:
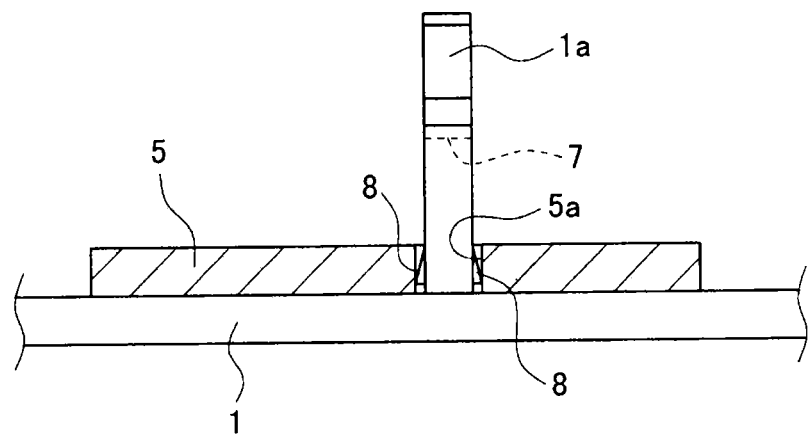
FIG. 5B is a cross-sectional view of a state of the protrusion insertion hole 5a of the panel attaching portion 5 fitted to and brought into close contact with the protrusion 1a of the panel 1.

As depicted in FIG. 5A, a distance K1 between the lower ends of the contact ribs 8 is slightly larger than a corresponding inner width K2 of the protrusion insertion hole 5a of the panel attaching portion 5 (K1>K2). The thickness t of the protrusion 1a is obviously smaller than the inner width K2 of the protrusion insertion hole 5a. Therefore, when the protrusion 1a of the panel 1 is fitted into the protrusion insertion hole 5a of the panel attaching portion 5 and the panel 1 is brought into close contact with the panel attaching portion 5, the contact ribs 8 are pressed and elastically deformed by the inner wall surfaces of the protrusion insertion holes 5a. This makes the protrusion 1a of the panel 1 unmovable in the longitudinal direction P. The protrusion 1a of the panel 1 has the contact ribs disposed on the both side surfaces in the width direction Q (see FIG. 2) and, therefore, the protrusion 1a is also made unmovable in the width direction Q.

Figure 6A:
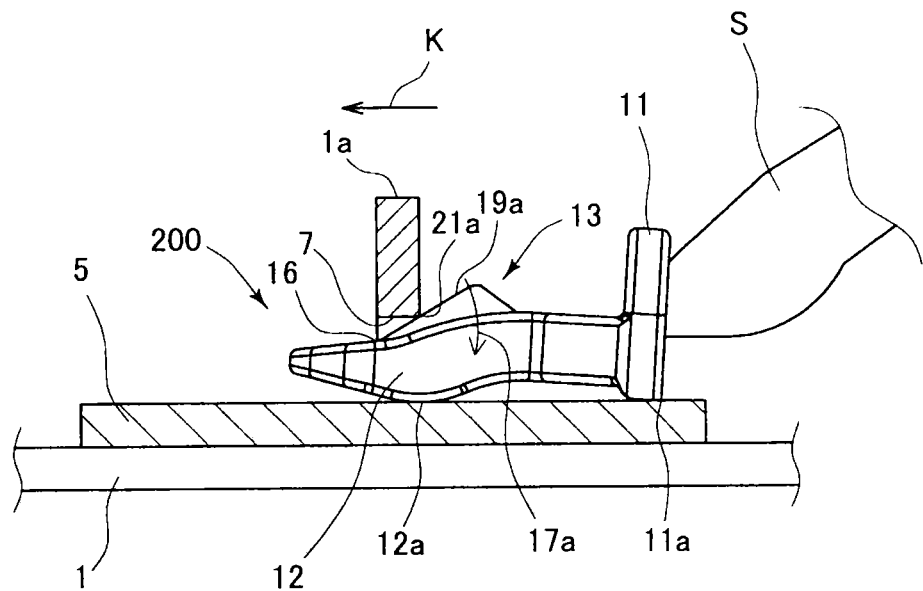
FIG. 6A is an operation explanatory diagram of a state of inserting a locking portion 6 of the clip 200 into a clip insertion hole 7.

As depicted in FIG. 6A, the locking portion 6 (locking main body portion 12) of the clip 200 is inserted into the clip insertion hole 7 of the panel 1. After the bottom surface 11a of the operational wall 11 and the bottom surface 12a of the locking main body portion 12 are brought into contact with the upper surface of each of the panel attaching portions 5 of the speaker bracket 3, the clip 200 is inserted while sliding on the upper surface. The width W1 and the height H1 of a section of the locking portion 6 of the clip 200 first inserted (the leading end of the locking main body portion 12) are smaller than the inner width W2 and the inside height H2 of the clip insertion hole 7. Additionally, the upper end (the leading end) of the locking main body portion 12 is chamfered at the both ends in the width direction Q and the height direction R. Therefore, an operator can easily insert the locking main body portion 12 of the clip 200 into the clip insertion hole 7. Since the bottom surface 12a of the locking main body portion 12 is lower by the distance e than the bottom surface 11a of the operational wall 11 (see FIG. 4B), the clip 200 is inserted in a slightly tilted manner as a whole.

Therefore, the clip 200 of this embodiment is inserted into the clip insertion hole 7 in an entirely tilted manner. The clip 200 is located with the bottom surface 12a of the locking main body portion 12 pressed by the upper surface of the panel attaching portion 5 to compress the locking main body portion 12. Due to this compression force, the panel 1 and the panel attaching portion 5 of the speaker bracket 3 are more rigidly attached to each other. A pressing force of the hook portion 13 of the clip 200 is increased in the height direction R at the same time.

Figure 6B:
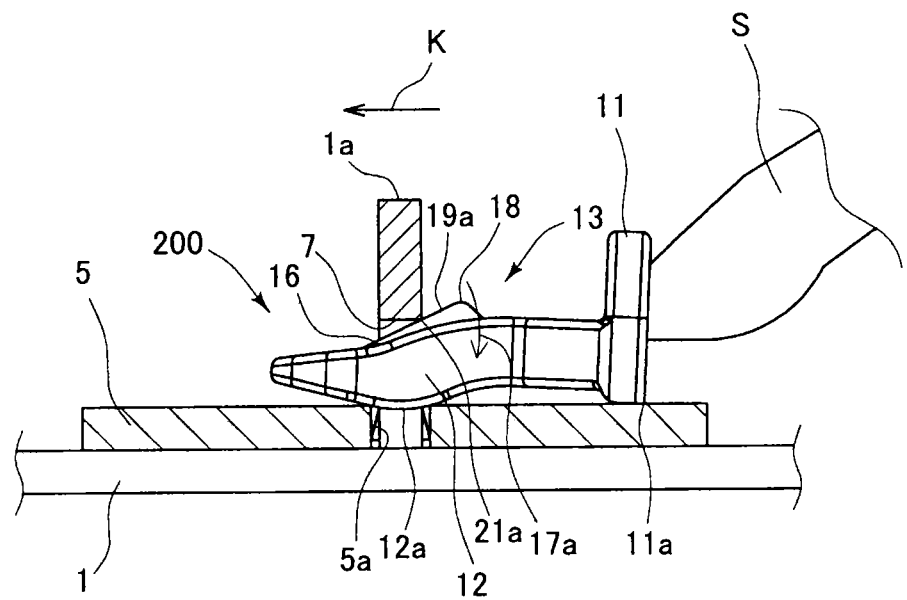
FIG. 6B is an operation explanatory diagram of the same.

When the leading end of the locking main body portion 12 of the clip 200 is inserted into the clip insertion hole 7, the front side inclined surface 19a of the hook portion 13 abuts on a horizontal opening edge (a rear side horizontal edge 21a) on the entry side on a ceiling surface of the clip insertion hole 7. As a result, the hook portion 13 rotates (elastically deforms) downward (in the direction of an arrow 17a) using the base end 16 as a fulcrum. As depicted in FIG. 6B, the bottom surface 12a of the locking main body portion 12 of the clip 200 drops into the protrusion insertion hole 5a of the panel attaching portion 5.

When the clip 200 is further thrusted in, the hook portion 13 of the clip 200 further rotates (elastically deforms) downward (in the direction of the arrow 17a). The bottom surface 12a of the locking main body portion 12 of the clip 200 correspondingly runs on the upper surface of the panel attaching portion 5.

Figure 7:
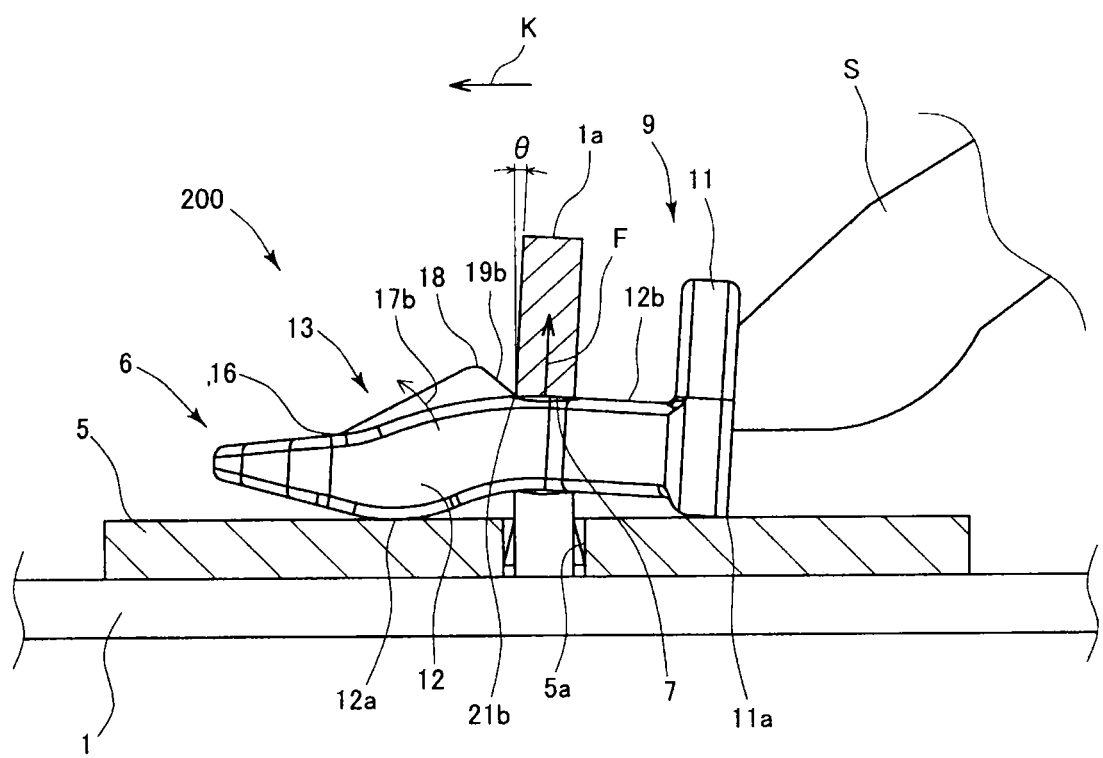
FIG. 7 is an operation explanatory diagram of the same.

As depicted in FIG. 7, when the top portion 18 of the hook portion 13 passes through the clip insertion hole 7, the hook portion 13 rotates (elastically deforms) upward (in the direction of an arrow 17b) using the base end 16 as a fulcrum, and the rear side inclined surface 19b of the hook portion 13 abuts on a horizontal opening edge (a front side horizontal edge 21b) on the exit side on the ceiling surface of the clip insertion hole 7, pressing the front side horizontal edge 21b with an elastic restoring force. The upper surface 12b of the locking portion 12 upwardly presses the ceiling surface of the clip insertion hole 7 of the protrusion 1a from the inside. In this state, the bottom surface 12a of the locking main body portion 12 and the bottom surface 11a of the operational wall 11 of the clip 200 press the upper surface of the panel attaching portion 5. Since a difference in height (the distance e) exists between the bottom surface 12a of the locking main body portion 12 and the bottom surface 11a of the operational wall 11 of the clip, the upper surface 12b of the locking main body portion 12 of the clip 200 in this state is located in an obliquely tilted manner relative to the horizontal plane (obliquely such that the height is greater in the front portion and reduced toward the rear side). As a result, the upper surface 12b of the locking main body portion 12 of the clip 200 presses the clip insertion hole 7 of the protrusion 1a in an oblique manner relative to the vertical direction (the direction orthogonal to an insertion direction K (see FIG. 7) of the clip 200). Due to this pressing force F, the protrusion 1a is tilted and bent (elastically deformed) backward by an angle θ. The upper surface 12b of the locking main body portion 12 of the clip 200 is also bent (elastically deformed) due to a reaction force from the protrusion 1a (an elastic restoring force of the protrusion 1a). A bent state (imaginary state) of the locking main body portion 12 of the clip 200 is shown in FIG. 7. Since the hook portion 13 presses the front side horizontal edge 21b of the clip insertion hole 7 and the upper surface 12b of the locking main body portion 12 of the clip 200 is in surface contact with an inner surface of the clip insertion hole 7 of the protrusion 1a in the pressed state to elastically deform the protrusion 1a, an elastic restoring force acts on the protrusion 1a. This elastic restoring force rigidly presses the locking main body portion 12 of the clip 200 and, therefore, the inserted clip 200 is hardly displaced.

A tilt angle 6 of the protrusion 1a is determined depending on a degree of the difference in height (distance e) in the clip 200. In other words, if the difference in height is greater, the upper surface 12b of the inserted clip 200 is more tilted.

The connecting portions 14 of the locking portion 6 abut on vertical opening edges (vertical edges 22) on the entry side of the both side wall surfaces of the clip insertion hole 7. A length L3 of the rear side inclined surface 19b of the hook portion 13 of the clip 200 is set such that, when the both connecting portions 14 abut on the vertical edges 22 of the side wall surfaces of the protrusion 1a, the rear side inclined surface 19b of the hook portion 13 is always located in the rear of the front side horizontal edge 21b of the protrusion 1a.

As a result, the hook portion 13 of the clip 200 presses the front side horizontal edge 21b of the clip insertion hole 7 in the protrusion 1a of the panel 1 and the upper surface 12b of the locking portion 12 presses the clip insertion hole 7 of the protrusion 1a to bend the protrusion 1a. Therefore, the clip 200 is restrained in the height direction R, and the both connecting portions 14 of the clip 200 press the vertical edges 22 in the clip insertion hole 7 to restrain the clip 200 in the width direction Q. Since the protrusion 1a of the panel 1 is pinched by the rear side inclined surface 19b of the hook portion 13 and the both connecting portions 14, the clip 200 is restrained in the longitudinal direction P. In other words, the speaker bracket 3 is restrained in the longitudinal direction P, the width direction Q, and the height direction R and brought into close contact with the panel 1 by the clip 200. As a result, for example, even if thermal creep or vibration occurs due to usage of the speaker, the clip 200 is not displaced. This means that the speaker bracket 3 can be attached to the panel 1 without rattling.

If the clip 200 is removed for any reason, the hook portion 13 is thrusted down in the direction of the arrow 17 (downward) with a tool such as a driver. This releases the pressing (elastic contact) between the rear side inclined surface 19b of the hook portion 13 and the front side horizontal edge 21b of the clip insertion hole 7, allowing the clip 200 to be pulled out from the clip insertion hole 7.

The applicant compared a speaker fixing operation using a conventional fastening means (bolts and case nuts) with a speaker fixing operation using the clip of this embodiment and acquired the following results.

(1) Although an operation time of the conventional fastening means is about 50 seconds, an operation time of the clip of this embodiment is about 18 seconds and a time per operation is reduced by 32 seconds.

(2) Although the conventional fastening means needs eight parts per speaker, the clip of this embodiment needs only four parts per speaker, reducing the number of parts by half.

(3) Although the conventional fastening means weighs about 44 g, the clip of this embodiment weighs about 5.6 g and the weight is reduced by 38.4 g.

In this description, the protrusion 1a is described as being bent backward in the longitudinal direction R. However, the protrusion 1a may be bent in the width direction Q.

Second Embodiment

Figure 9A:
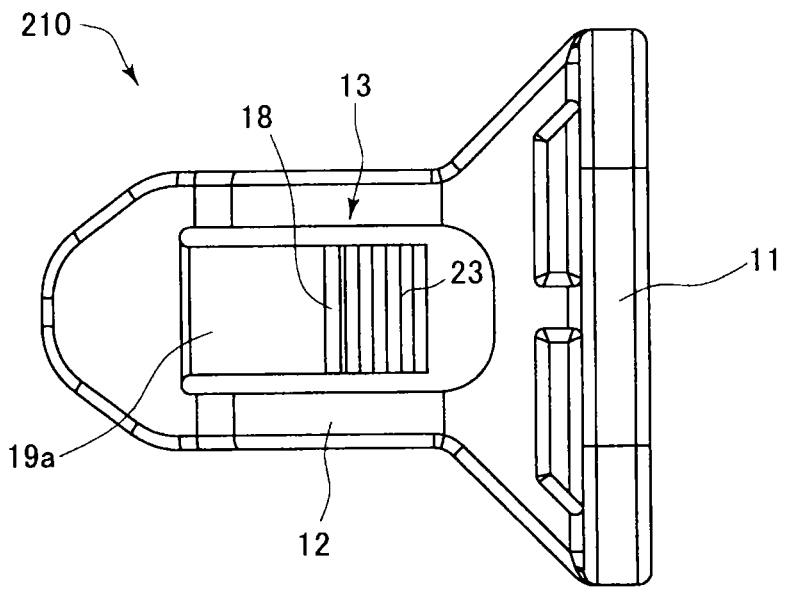
FIG. 9A is a plain view of a clip 210 of a second embodiment.
Figure 9B:
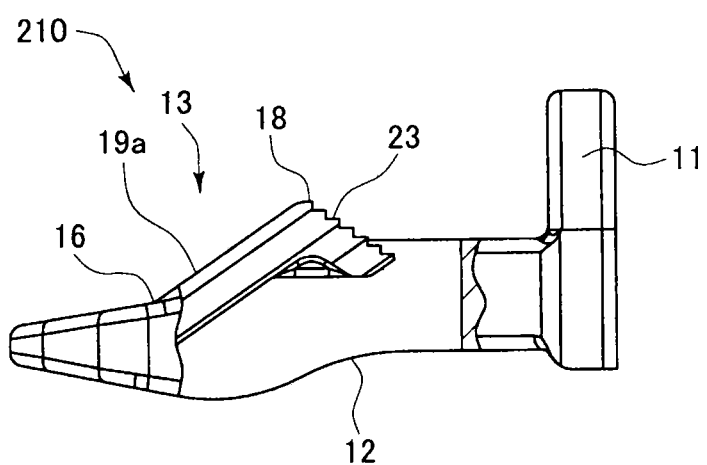
FIG. 9B is a front view of the same.

A clip 210 of a second embodiment will be described. The clip of this embodiment is used for fixing a speaker. Since the clip in a mounted state always receives vibrations from the speaker, it is desirable to more rigidly mount the clip. Therefore, a plurality of stepped portions 23 descending in a step-like shape from the top portion 18 toward the operational wall 11 is disposed on a rear section of the hook portion 13 of the clip 210 of the second embodiment depicted in FIG. 9 (a section corresponding to the rear side inclined surface 19b of the clip 200 of the first embodiment).

Figure 8A:
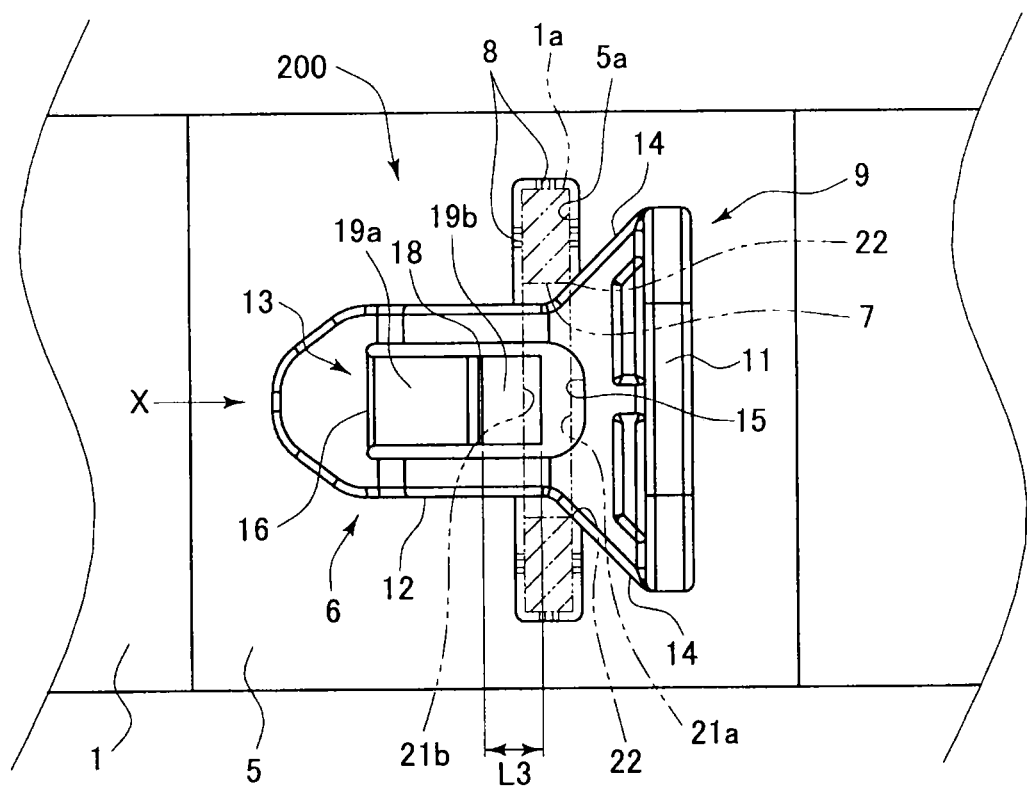
FIG. 8A is a plain view of the state of FIG. 7.
Figure 8B:
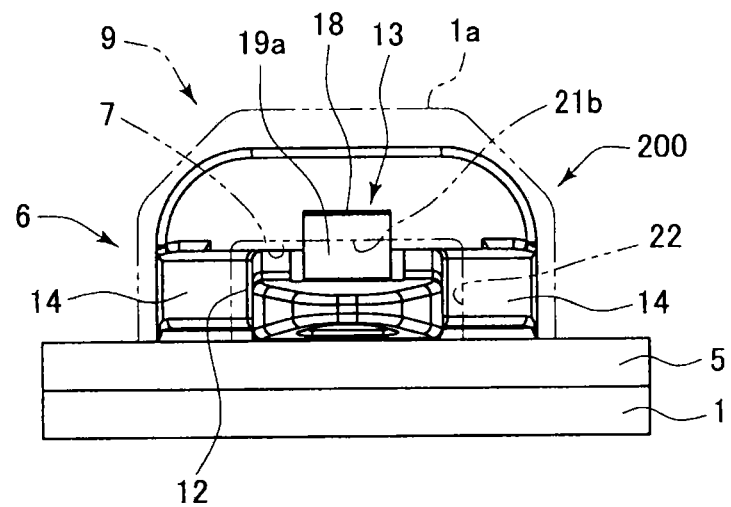
FIG. 8B is a view of an arrow X of FIG. 8A.
Figure 10A:
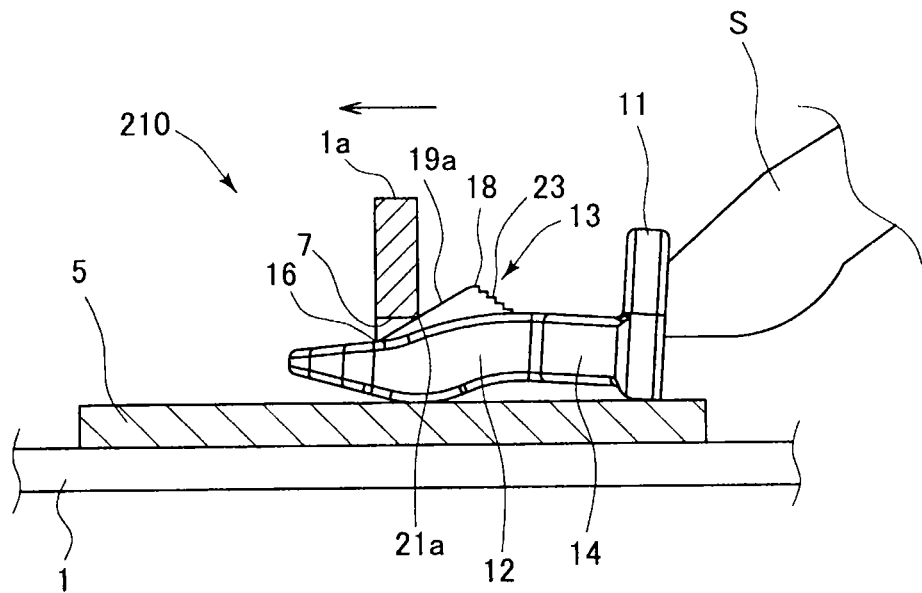
FIG. 10A is an operation explanatory diagram of a state of inserting the locking portion 6 of the clip 210 of the second embodiment into the clip insertion hole 7.
Figure 10B:
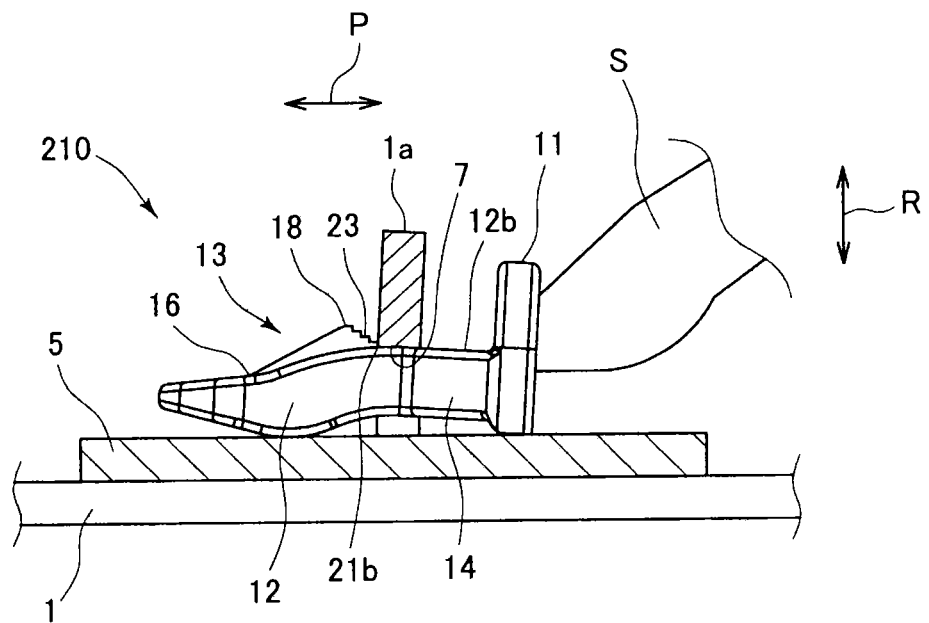
FIG. 10B is an operation explanatory diagram of the same.

As depicted in FIGS. 10A and 10B, when the clip 210 of the second embodiment is inserted into the clip insertion hole 7 of the protrusion 1a of the panel 1 and the top portion 18 of the hook portion 13 passes through the front side horizontal edge 21b of the clip insertion hole 7, the front side horizontal edge 21b of the protrusion 1a enters into and engages with any one of the stepped portions 23. Therefore, the clip 210 is restrained in the longitudinal direction P and the height direction R. As is the case with the clip 200 of the first embodiment, since a pair of the connecting portions 14 of the clip 210 is in close contact with the vertical edges 22 on the rear side of the protrusion 1a in this state, the clip 210 is restrained in the width direction Q (see FIG. 8A). As a result, the restraint state between the clip 210 and the protrusion 1a is reinforced and the clip 210 is more certainly prevented from falling off.

Third Embodiment

Figure 11A:
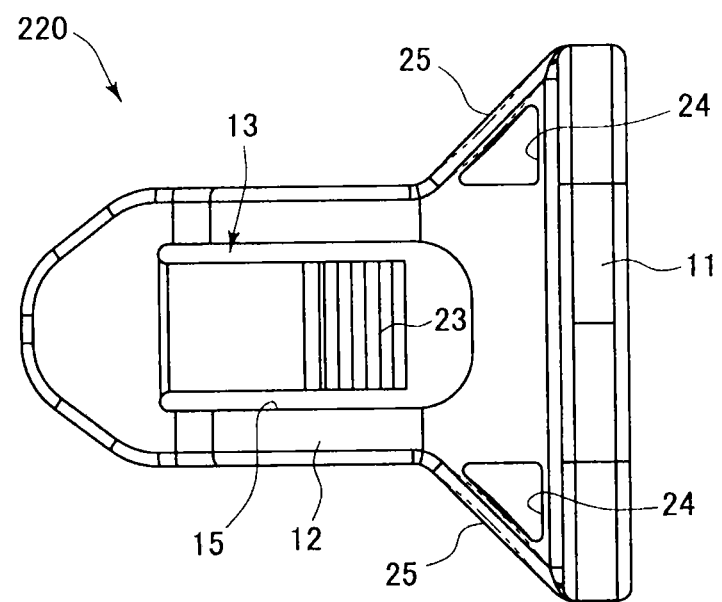
FIG. 11A is a plain view of a clip 220 of a third embodiment.

A clip 220 of a third embodiment will be described. The clip 220 of the third embodiment depicted in FIG. 11A is provided with a hollow portions 24 penetrating in the height direction R in sections surrounded by the connecting portions 14, the cutout portion 15, and the operational wall 11 in the locking main body portion 12 as compared to the clip 210 of the second embodiment. As a result, thin-walled portions 25 having a reduced thickness are formed in the connecting portions 14. Therefore, as compared to the clip 200 of the first embodiment, the thin-walled portions 25 (connecting portions 14) are easily elastically deformed.

As is the case with the clip 200 of the first embodiment, when the clip 220 of the third embodiment is inserted into the clip insertion hole 7 of the protrusion 1a, a pair of the thin-walled portions 25 of the clip 220 comes into close contact with the vertical edges 22 on the rear side. When the clip 220 is further thrusted in, a pair of the thin-walled portions 25 is pressed and elastically deformed by the vertical edges 22 on the rear side. Therefore, the clip 220 of the third embodiment increases an amount of the elastic deformation of a pair of the thin-walled portions 25 and increases a reaction force so as to increase a restraining force in the width direction Q such that the clip 220 is hardly displaced. In FIG. 11A, an elastically deformed state of a pair of the thin-walled portions 25 is indicated by dashed-two dotted lines.

Fourth Embodiment

Figure 11B:
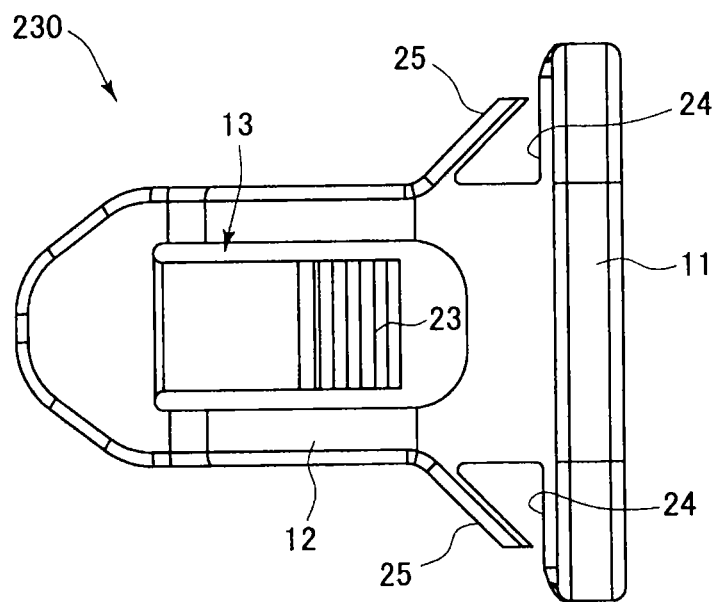
FIG. 11B is a plain view of a clip 230 of a fourth embodiment.

As in a clip 230 of a fourth embodiment depicted in FIG. 11B, connecting sections between a pair of the thin-walled portions 25 and the operational wall 11 may be cutoff in the clip 220 of the third embodiment to form a pair of the thin-walled portions 25 into a cantilever stabilizer shape. As a result, a pair of the thin-walled portions 25 is more easily elastically deformed.

Fifth Embodiment

Figure 12A:
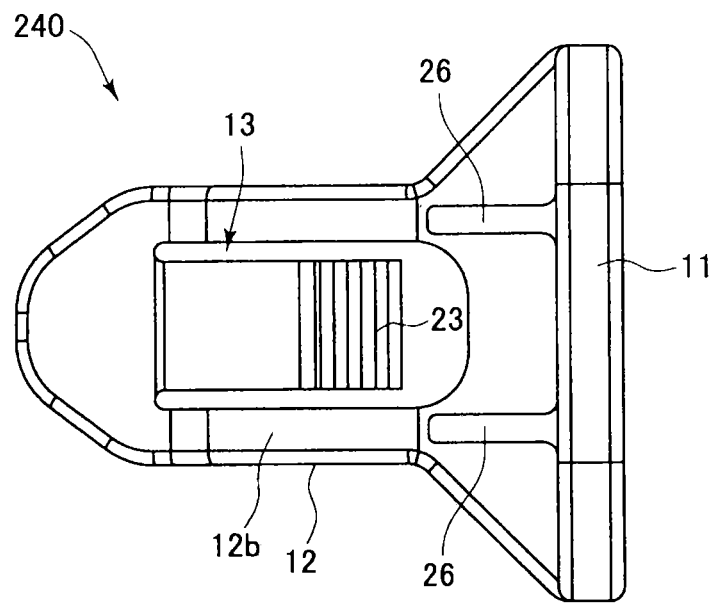
FIG. 12A is a plain view of a clip 240 of a fifth embodiment.
Figure 12B:
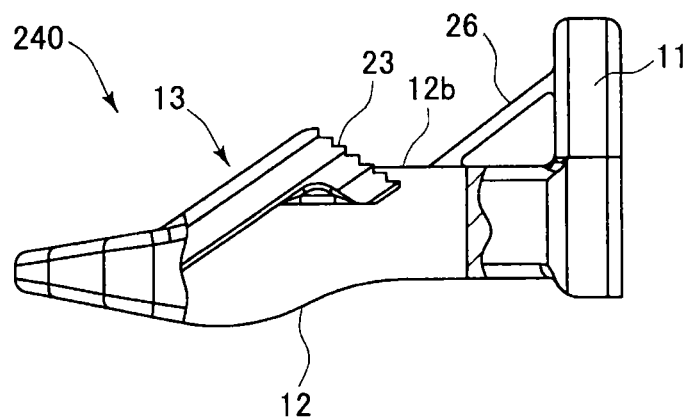
FIG. 12B is a partially cutaway front view of the clip 240 of the fifth embodiment.

A clip 240 of a fifth embodiment will be described. As depicted in FIGS. 12A and 12B, the clip 240 of the fifth embodiment is provided with coupling portions 26 obliquely coupling the upper surface of the locking main body portion 12 and the front side surface of the operational wall 11 as compared to the clip 220 of the third embodiment. When the clip 240 of the fifth embodiment is inserted into the clip insertion hole 7 of the protrusion 1a, the stepped portions 23 of the clip 240 enters into and engages with the front side horizontal edge 21b and the coupling portions 26 of the clip 240 come into close contact with the rear side horizontal edge 21a. When the clip 240 is further thrusted in, the coupling portions 26 are pressed and elastically deformed by the rear side horizontal edge 21a. Therefore, the clip 240 of the fifth embodiment is further enforced in the restraint in the longitudinal direction P and the height direction R of the clip 240 by both the stepped portions 23 and the coupling portions 26.

Sixth Embodiment

Figure 13:
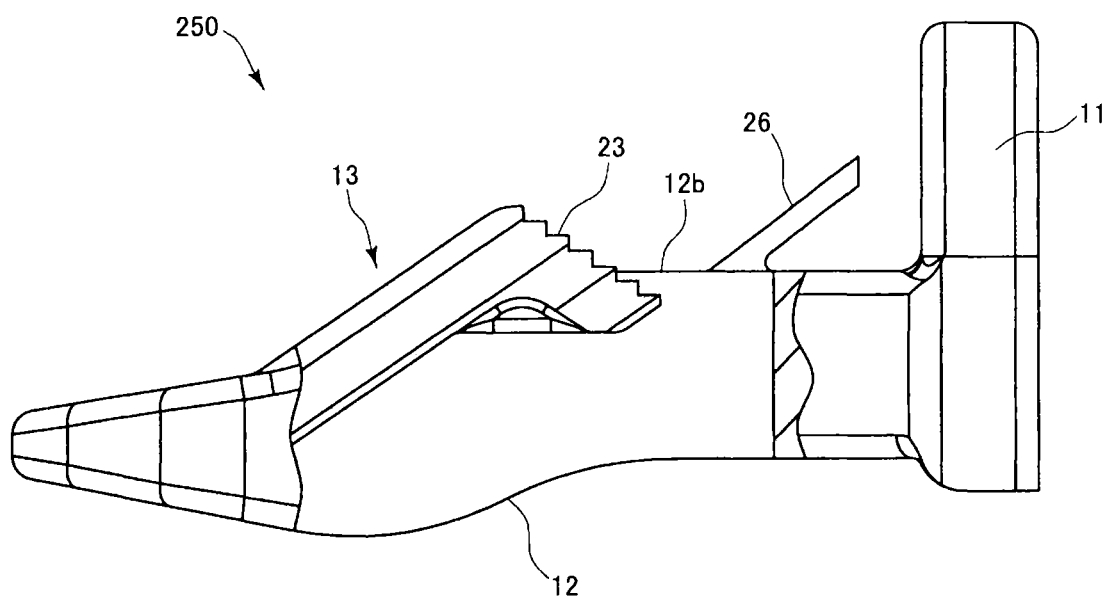
FIG. 13 is a partially cutaway enlarged front view of a clip 250 of a sixth embodiment.

As in a clip 250 of a sixth embodiment depicted in FIG. 13, upper ends of the coupling portions 26 (sections connecting with the operational wall 11) may be cutoff in the clip 240 of the fifth embodiment to form the coupling portions 26 into a cantilever stabilizer shape. As a result, the coupling portions 26 are more easily elastically deformed.

In the clips 230 to 250 of the fourth to sixth embodiments, steps similar to those of the clip 210 of the second embodiment may be formed in the sections of the thin-walled portions 25 and the coupling portions 26.

Seventh Embodiment

Figure 14A:
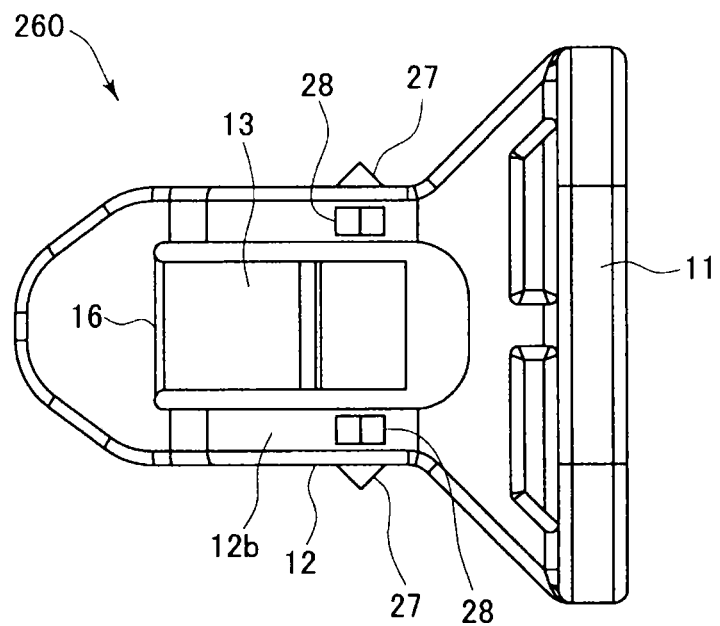
FIG. 14A is a plain view of a clip 260 of a seventh embodiment.
Figure 14B:
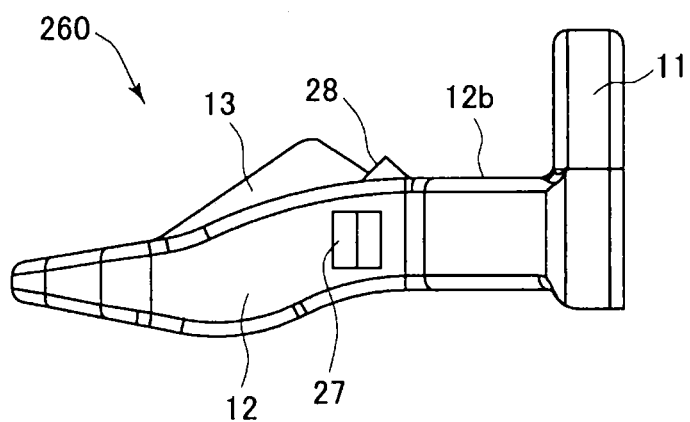
FIG. 14B is a front view of the same.
Figure 15:
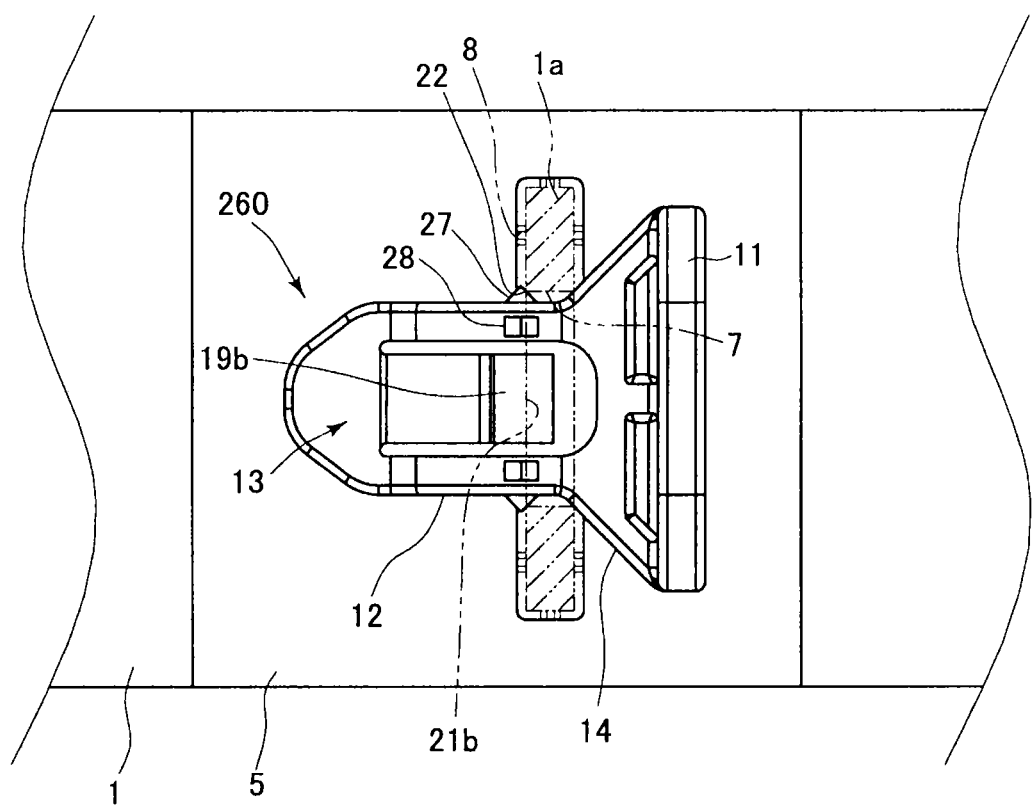
FIG. 15 is a plain view of an attached state of the clip 260 of the seventh embodiment.

As in a clip 260 of a seventh embodiment depicted in FIGS. 14A and 14B, the side surfaces and/or the upper surface 12*b* of the locking main body portion 12 may be provided with hook portions 27, 28 having an approximate isosceles triangular cross section. As depicted in FIG. 15, when the clip 260 is inserted into the clip insertion hole 7 of the protrusion 1*a*, the hook portions 27 press the vertical edges 22 on the front side of the clip insertion hole 7 and the hook portions 28 press the front side horizontal edge 21*b* of the clip insertion hole 7. As a result, the clip 260 is more certainly restrained in the longitudinal direction R and the width direction Q.

Figure 16A:
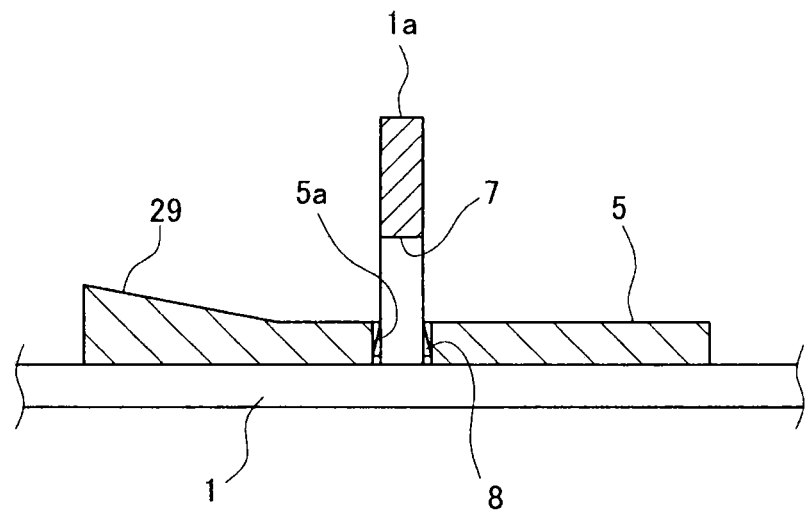
FIG. 16A is a front cross-sectional view of the panel attaching portion 5 disposed with an inclined surface 29 at a front end.
Figure 16B:
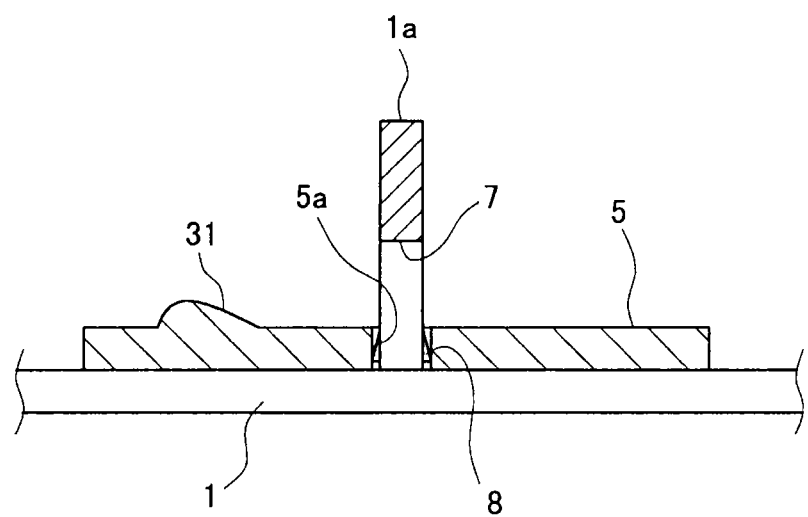
FIG. 16B is a front cross-sectional view of the panel attaching portion 5 disposed with a convex portion 31 at the front end.

The clips 200 to 260 of the embodiments are formed such that a difference (e) in height is generated between the bottom surface 12*a* of the locking main body portion 12 and the bottom surface 11*a* of the operational wall 11 to tilt the upper surface 12*b* of the locking portion 12 in the attached state so as to bend the protrusion 1*a*. However, the protrusion 1*a* of the panel 1 may be bent by disposing on the front portion of the panel attaching portion 5 an inclined surface 29 gradually increasing in height toward the front side as depicted in FIG. 16A or by disposing a convex portion 31 on the front portion of the panel attaching portion 5 as depicted in FIG. 16B. In the case of the panel attaching portion 5 described above, it is not necessary to generate the difference in height (distance e) between the bottom surface 12*a* of the locking main body portion 12 and the bottom surface 11*a* of the operational wall 11 of the clips 200 to 260.

Although the protrusion insertion holes 5*a* of the speaker bracket 3 of the embodiments have an approximate rectangular shape corresponding to the cross-sectional shape of the protrusion 1*a*, the shape may be a circular or triangular shape depending on the cross-sectional shape of the protrusion 1*a*.

The embodiments have been described in terms of fastening two members (the panel 1 and the panel attaching portion 5 of the speaker bracket 3). However, the number of fastened members may be three or more.

Figure 17:
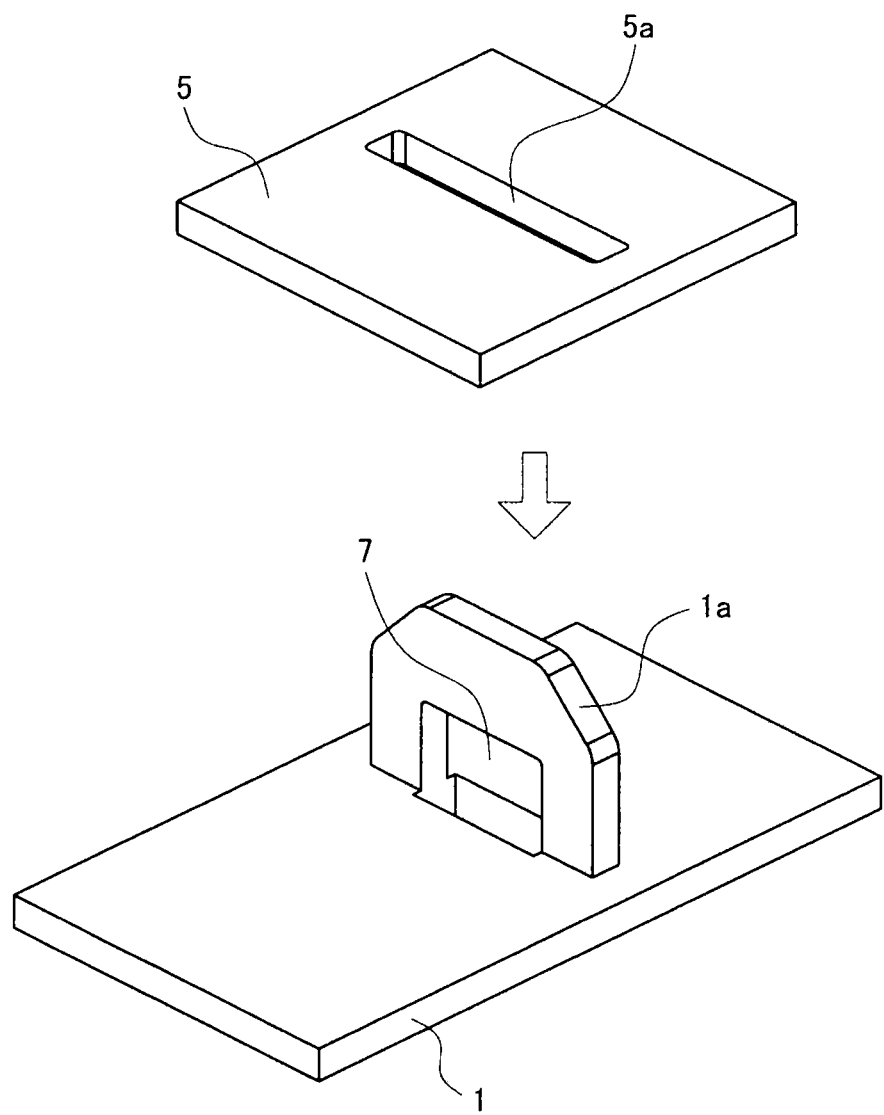
FIG. 17 is a perspective view of the panel 1 without a contact rib 8 and the panel attaching portion 5.
Figure 18:
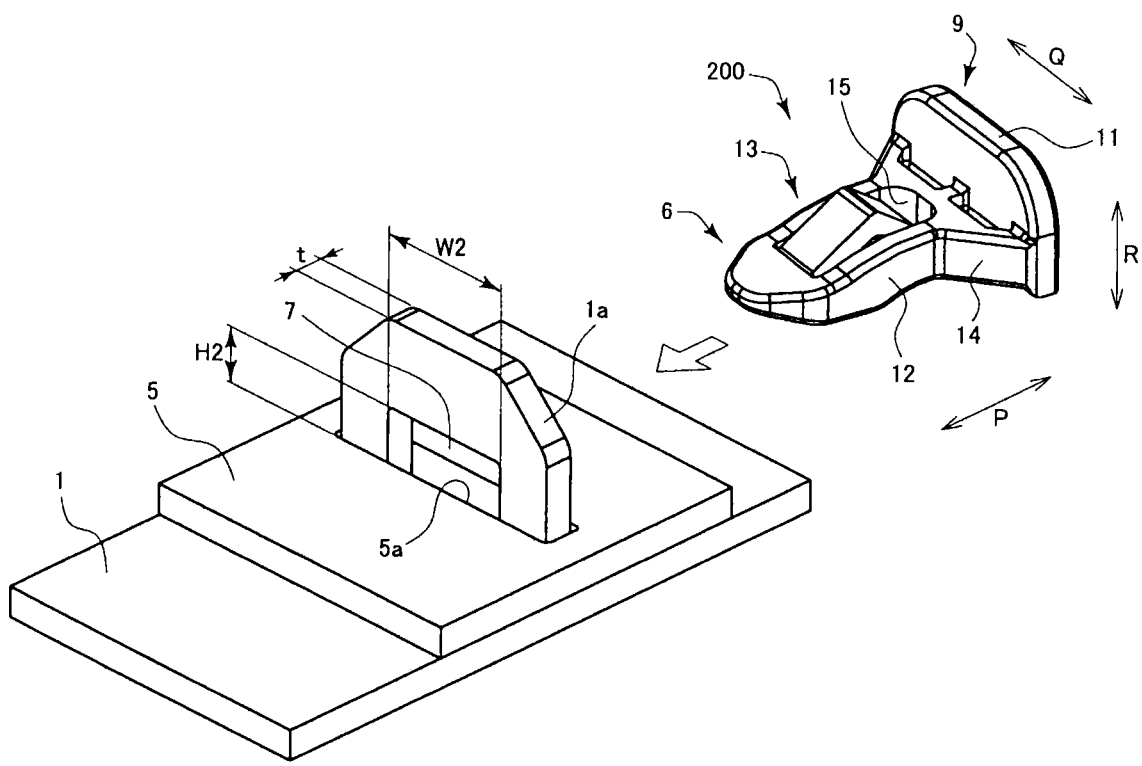
FIG. 18 is a diagram of a state of inserting the clip 200 into the panel 1 without the contact rib 8.

The embodiments have the contact ribs 8 disposed on the sections of the protrusion 1*a* of the panel 1. When the protrusion insertion holes 5*a* of the panel attaching portion 5 is fitted to the protrusion 1*a*, the contact ribs 8 abut on inner peripheral surfaces of the protrusion insertion holes 5*a* to prevent the panel attaching portion 5 from rattling. However, as depicted in FIGS. 17 and 18, the contact ribs 8 may not be disposed on the protrusion 1*a* of the panel 1 on the condition that the panel attaching portion 5 does not rattle.

INDUSTRIAL AVAILABILITY

The clip according to the invention is usable for fixing a vibrating member (e.g., in-vehicle speaker).

EXPLANATIONS OF LETTERS OR NUMERALS

100 speaker
200 to 260 clip
1 panel (member)
1*a* protrusion
5 panel attaching portion (member)
5*a* protrusion insertion hole
6 locking portion
7 clip insertion hole
8 contact rib
9 operation portion
11 operational wall (operation portion)
11*a* bottom surface
12 locking main body portion (locking portion)
12*a* bottom surface
12*b* upper surface (section facing an inner surface of an insertion hole)
13 hook portion (second pressing portion)
14 connecting portion (connecting section, first pressing portion)
16 base end
18 top portion
19*a* front side inclined surface (first taper-shaped portion)
19*b* rear side inclined surface (second pressing portion, second taper-shaped portion)
21*b* front side horizontal edge (second opening edge)
22 vertical edge (first opening edge)
23 stepped portion
25 thin-walled portion
27 hook portion (protrusion)
K insertion direction
P longitudinal direction
Q width direction
R height direction

The invention claimed is:

1. A structure comprising a clip made of a resin material for fastening at least two members and the two members,
    at least one of the two members is disposed with a clip insertion hole for thrusting the clip into,
    the clip includes an operation portion which is disposed at a rear end of the clip, and a locking portion which is disposed to be connected to the operation portion and inserted into the clip insertion hole,
    the locking portion includes a locking main body portion extended to a front side of the operation portion in a direction intersecting with the operation portion, a hook portion which is cut out by a cutout portion disposed at an upper surface of the locking main body portion and is coupled to the locking main body portion only by a base end disposed on the front side and is elastically freely rotatable upward and downward using the base end as a fulcrum, and a connecting portion between the operation portion and the locking main body portion formed into a taper shape expanding in a width direction toward the operation portion in plan view of the clip,
    a width of the locking main body portion is narrower than an inner width of the clip insertion hole, and a width of the operation portion is wider than the inner width of the clip insertion hole,
    the hook portion includes a front side inclined surface having a projecting length from the upper surface of the locking main body portion continuously increasing from the base end of the hook portion toward the operation portion and a rear side inclined surface connected via a top portion of the hook portion to the front side inclined surface and having a projecting length from the upper surface of the locking main body portion continuously decreasing toward the operation portion, a length of the rear side inclined surface of the hook portion is set such that, when the connecting portion abuts on a first opening edge that is a vertical opening edge on an entry side of the clip insertion hole, an end of the rear side inclined surface is located in the rear of a second opening edge that is a horizontal edge on an exit side of the clip insertion hole, a height of the upper surface of the locking main body portion is set such that, when the connecting portion abuts on the first opening edge, the upper surface of the locking main body portion upwardly presses a ceiling surface of the clip insertion hole, a height from a bottom surface of the locking main body portion to the base end of the hook portion is lower than an inside height of the clip insertion hole, and a height to the top portion of the hook portion is higher than the inside height of the clip insertion hole, a length from a back surface of the operation portion to the front end of the connecting portion is shorter than a distance from the back surface to the top portion of the hook portion, a distance from the connecting portion to the top portion of the hook portion is shorter than a length in a longitudinal direction of the clip insertion hole.

2. The structure of claim 1, wherein
the operation portion has a rectangular plate shape, wherein
the locking portion has a tongue shape extended from one surface of the operation portion in a direction intersecting with the operation portion, and wherein
a bottom surface of the locking main body portion is lower than a bottom surface of the operation portion.

3. The structure of claim 2, wherein
while the bottom surface of the operation portion and the bottom surface of the locking main body portion are located on a same horizontal surface, a section of the upper surface of the locking main body portion pressing an inner peripheral surface of the clip insertion hole in a height direction is obliquely located relative to the horizontal surface.

4. The structure of claim 1, wherein a leading end of the locking main body portion has a taper shape in a width direction and/or a height direction.

5. The structure of claim 1, wherein
one of the two members is a panel member disposed with a protrusion in a height direction, wherein the protrusion is disposed with the clip insertion hole in a direction intersecting with the height direction, wherein
the other of the two members is a panel member disposed with a protrusion insertion hole for allowing insertion of the protrusion of the panel member, and wherein
the protrusion of the one member has a lower end disposed with contact ribs pressing inner wall surfaces of the protrusion insertion hole from the inside when the protrusion is inserted into the protrusion insertion hole of the other panel member.

6. The structure of claim 5, wherein the contact ribs are chamfered at leading ends.

7. The structure of claim 1, wherein
the rear side inclined surface of the hook portion is disposed with a stepped portion in a step-like shape, and wherein
when the locking portion is inserted into the clip insertion hole, the second opening edge enters into and engages with the stepped portion.

8. The structure of claim 1, wherein a hollow portion penetrating in a height direction is provided in sections surrounded by a taper surface of the connecting portion, the cutout portion of the locking main body portion, and the operation portion.

9. The structure of claim 1, wherein an inner peripheral surface of the clip insertion hole is disposed with a protrusion pressing the locking portion of the clip inserted into the clip insertion hole.

10. The structure of claim 1, wherein a vibration generating member is attached to at least one of the members.

11. The structure of claim 10, wherein the vibration generating member is an in-vehicle speaker.

12. The structure of claim 4, wherein connecting sections between a thin-walled portion of the connecting portion and the operation portion is cutoff.

13. The structure of claim 1, wherein a coupling portion is provided at a section between the rear side inclined surface and the operation portion, and the coupling portion is obliquely coupling the upper surface of the locking main body portion and the front side of the operation portion.

14. The structure of claim 13, wherein upper ends of the coupling portion are cutoff.

15. The structure of claim 1, wherein side surfaces and/or the upper surface of the locking main body portion is provided with a hook portion having an approximate isosceles triangular cross section.

* * * * *